United States Patent [19]

Stanley

[11] Patent Number: 5,089,164
[45] Date of Patent: Feb. 18, 1992

[54] MULTI-PURPOSE PAINT AND VARNISH STRIPPER

[76] Inventor: Donald E. Stanley, 2435 Wheeler Rd., Bay City, Mich. 48706

[21] Appl. No.: 633,778

[22] Filed: Dec. 26, 1990

[51] Int. Cl.$^5$ .......................... C11D 7/22; C11D 7/50; B08B 7/00
[52] U.S. Cl. ..................................... 252/162; 252/153; 252/170; 252/171; 252/DIG. 8; 134/38; 134/39; 134/40
[58] Field of Search ............... 252/153, 162, 170, 171, 252/DIG. 8; 134/38, 39, 40

[56] References Cited

U.S. PATENT DOCUMENTS

| | | | |
|---|---|---|---|
| 4,483,783 | 11/1984 | Albanese | 252/DIG. 8 |
| 4,664,721 | 5/1987 | Valasek | 252/170 |
| 4,770,713 | 9/1988 | Ward | 252/DIG. 8 |
| 4,780,235 | 10/1988 | Jackson | 252/170 |
| 4,812,255 | 3/1989 | Suwala | 252/170 |

Primary Examiner—Paul Liberman
Assistant Examiner—William S. Parks
Attorney, Agent, or Firm—Merlin B. Davey

[57] ABSTRACT

This invention provides a paint stripping composition comprising N-methyl-2-pyrrolidone. The composition does not include any halogenated hydrocarbons, acids, caustics or waxes and is not harmful to a wide variety of substrates.

8 Claims, No Drawings

MULTI-PURPOSE PAINT AND VARNISH STRIPPER

BACKGROUND OF THE INVENTION

This invention relates to compositions and methods for chemically removing paint and varnish from wood, metal, glass, fiberglass and many plastics surfaces. Prior to the realization of the various health hazards caused by halogenated hydrocarbon chemicals, the cornerstone of the paint stripping industry was methylene chloride. With the discovery of the hazards connected with the use of such materials many proposals have been made for paint and varnish stripping compositions that do not include halogenated hydrocarbons. Hitherto, the most successful of these developments required the use of acids, thereby creating the problems of neutralization and/or harming the surface to be stripped. A recent patent, U.S. Pat. No. 4,965,010 to Ralph R. Swett, proposes to solve the problem by employing approximately equal parts of methyl ethyl ketone, methyl alcohol, toluene and acetone. The volatile nature of such compositions can create severe ventilation problems when working in confined spaces and further requires the use of large amounts of thickeners to assist in keeping the stripping compositions in place long enough to do a thorough stripping job.

SUMMARY OF THE INVENTION

This invention provides an improved composition and method for stripping paint or varnish from a variety of substrates such as, for example, wood, metal, glass, fiberglass, and plastics which comprises N-methyl-2-pyrrolidone, toluene, lower aliphatic alcohols, lower alipathic ketones, propylene glycol, mineral spirits, surfactants, thickeners, and optionally, ethyl 3-ethoxypropionate. While N-methyl-2-pyrrolidone alone works to remove paint and varnish, it was found that the action was slow and other ingredients are necessary in such compositions in order to provide a fast-acting stripping composition that is safe to handle and does not harm the surface to be stripped.

DETAILED DESCRIPTION

When employing ethyl 3-ethoxypropionate and N-methyl-2-pyrrolidone the compositions of this invention are preferably prepared by first blending the desired amounts of N-methyl-2-pyrrolidone and ethyl 3-ethoxypropionate. When properly mixed these components remove the paint and/or varnish without the development of air bubbles which serve to prevent the stripping composition from penetrating all layers of the paint or varnish to be removed.

After blending or thoroughly mixing the N-methyl-2-pyrrolidone and ethyl 3-ethoxypropionate the remaining ingredients comprising toluene, methyl ethyl ketone, methyl alcohol, acetone, Pluronic TM F-60, (a block copolymer of propylene oxide and ethylene oxide having an HLB of 24.0), Pluracol TM W-660, (alkoxylated alcohol), i.e., a polymer of methyl oxirane with monobutyl ether oxirane), Iconol TM DA-4, (ethoxylated decyl alcohol having an HLB of 11.0) and thickeners such as, for example, hydroxypropyl cellulose, and others known in the art, can be added and mixed as desired.

While a composition comprising from about 40 to about 70 weight percent N-methyl-2-pyrrolidone, 15 to about 50 weight percent ethyl 3-ethoxypropionate and about 10 to about 45 weight percent toluene, all percentages based on total weight of the composition, is an effective paint and varnish stripper, such a composition tends to leave a light film on the substrate. A preferred composition in accordance with the present invention comprises the following materials and amounts, the weight percentages all being based on the total weight of the composition:

|  | Wt. % |
| --- | --- |
| N-methyl-2-pyrrolidone | 15-35 |
| Ethyl 3-ethoxypropionate | 15-35 |
| Toluene | 10-20 |
| Methyl ethyl ketone | 5-10 |
| Methyl alcohol | 5-20 |
| Acetone | 5-10 |
| Pluronic ® F-60 | 1-5 |
| Pluracol ® W-660 | 1-5 |
| Iconol ® DA-4 | 1-5 |
| Thickener | 2-5 |

Another preferred composition in accordance with the present invention comprises the following materials and amounts, the weight percentages all being based on the total weight of the composition:

|  | Wt. % |
| --- | --- |
| N-methyl-2-pyrrolidone | 5-15 |
| Toluene | 10-20 |
| Isopropyl alcohol | 5-10 |
| Propylene glycol | 5-10 |
| Methyl ethyl ketone | 5-15 |
| Methyl alcohol | 5-15 |
| Acetone | 5-10 |
| Surfactant | 3-10 |
| Thickener | 2-5 |
| Mineral spirits | 1-5 |
| Dibasic esters | 1-5 |

Dibasic esters useful as solvents in the compositions of this invention include, for example, dimethyl glutarate, dimethyl adipate and dimethyl succinate. A preferred mixture of dibasic esters includes about 66 weight percent dimethyl glutarate, about 17 weight percent dimethyl adipate and about 16.5 weight percent dimethyl succinate. In the most preferred compositions, hydroxypropyl cellulose is employed as the thickener.

The compositions of this invention do not burn the skin, do not raise the grain or fur the wood, do not harm veneers, patina, glue joints, glass, fiberglass, most plastics or metal and do not require neutralizing or a water wash. Because of their reduced volatility the compositions of this invention have increased effectiveness without requiring excessive amounts of thickeners. Further, a wax sealer is not needed to reduce evaporation. Wax sealers generally leave a residue or film on stripped surfaces and thus interfere with finishes that are to be reapplied.

The compositions of the invention can be applied as a liquid or can be thickened sufficiently to form a semi-paste like product. No acids or caustics are employed and no halogenated hydrocarbons. The compositions will soften most paints and varnishes in from 1 to 3 minutes, at which time the residue can be readily removed with a scraper or a rag or brush moistened with further stripping composition. Urethane finishes require a somewhat longer time to soften and the use of the semi-paste formulation rather than the liquid formulation is suggested.

Various modifications may be made in the present invention without departing from the spirit or scope thereof, as will be understood by those skilled in the art.

I claim:

1. A composition for stripping paint and varnish free from acid and caustic and consisting essentially of from 5-15 weight percent of N-methyl-2-pyrrolidone, 10-20 weight percent of toluene, 5-15 weight percent of methyl alcohol, 5-10 weight percent of propylene glycol, 3-10 weight percent of at least one surfactant, 1-5 weight percent of dibasic esters, and 2-5 weight percent of a thickener, all percentages being based on the total weight of the stripping composition.

2. Composition of claim 1 comprising, in addition from 5-10 weight percent of isopropyl alcohol based on the total weight of the stripping composition.

3. Composition of claim 2 comprising, in addition, from 5-10 weight percent of acetone, based on the total weight of the stripping composition.

4. Composition of claim 3 comprising, in addition, from 1-5 weight percent of mineral spirits, based on the total weight of the stripping composition.

5. Composition of claim 1 wherein the thickener is hydroxypropyl cellulose.

6. Composition of claim 5 wherein the surfactant comprises ethoxylated decyl alcohol having an HLB of 11.0, a block copolymer of propylene oxide and ethylene oxide having an HLB of 24.0 and an alkoxylated, alcohol which is a polymer of methyl oxirane and monobutyl ether oxirane, each of said surfactants being present in an amount of from 1-5 weight percent based on the weight of the total composition.

7. Method for stripping paint and varnish from surfaces coated with said paint or varnish which comprises applying the composition of claim 1 to said painted or varnished surface and thereafter removing the softened paint or varnish.

8. Method for stripping paint and varnish from surfaces coated with said paint or varnish which comprises applying the composition of claim 6 to said painted or varnished surface and thereafter removing the softened paint or varnish.

* * * * *